United States Patent [19]

Feist

[11] Patent Number: 4,886,643
[45] Date of Patent: Dec. 12, 1989

[54] APPARATUS FOR PROPORTIONING REACTION MIXTURES

[75] Inventor: Norbert Feist, Hilchenbach, Fed. Rep. of Germany

[73] Assignee: Battenfeld Maschinenfabriken GmbH, Meinerzhagen, Fed. Rep. of Germany

[21] Appl. No.: 49,708

[22] Filed: May 13, 1987

[30] Foreign Application Priority Data

May 15, 1986 [DE] Fed. Rep. of Germany ....... 3616463

[51] Int. Cl.$^4$ .......................... B01F 5/04; B01F 15/02
[52] U.S. Cl. ..................................... 422/133; 422/116; 366/136; 366/159; 366/173
[58] Field of Search ....................... 422/133, 105, 116; 366/137, 136, 159, 173

[56] References Cited

U.S. PATENT DOCUMENTS 4,399,104 8/1983 Coblenz et al. ...................... 422/133
4,572,820 2/1986 Boden ................................. 422/133

FOREIGN PATENT DOCUMENTS 2823761 2/1979 Fed. Rep. of Germany ....... 422/133

Primary Examiner—Michael S. Marcus
Attorney, Agent, or Firm—Toren, McGeady & Associates

[57] ABSTRACT

An apparatus for proportioning reaction mixtures, particularly for the manufacture of hard polyurethane foam. The apparatus includes two proportioning cylinders each for proportioning one of the components to a mixing head. The pistons of the two proportioning cylinders can be operated alternatingly for filling the cylinders with the compound and subsequently ejecting the component from the cylinders. Double-acting hydraulic cylinders driven by a common hydraulic pump operate independently from each other the proportioning pistons of the two proportioning cylinders. A servo-controlled proportional valve is provided in each of the connecting lines between the hydraulic cylinders and the hydraulic pump. The control cycles of the proportional valves determining the ejection of the two cooperating proportioning cylinders are adjusted relative to each other so as to temporarily overlap. The apparatus makes it possible to obtain a continuous constant flow of the components into the mixing head in spite of the intermittent operation of the proportioning pistons.

5 Claims, 2 Drawing Sheets

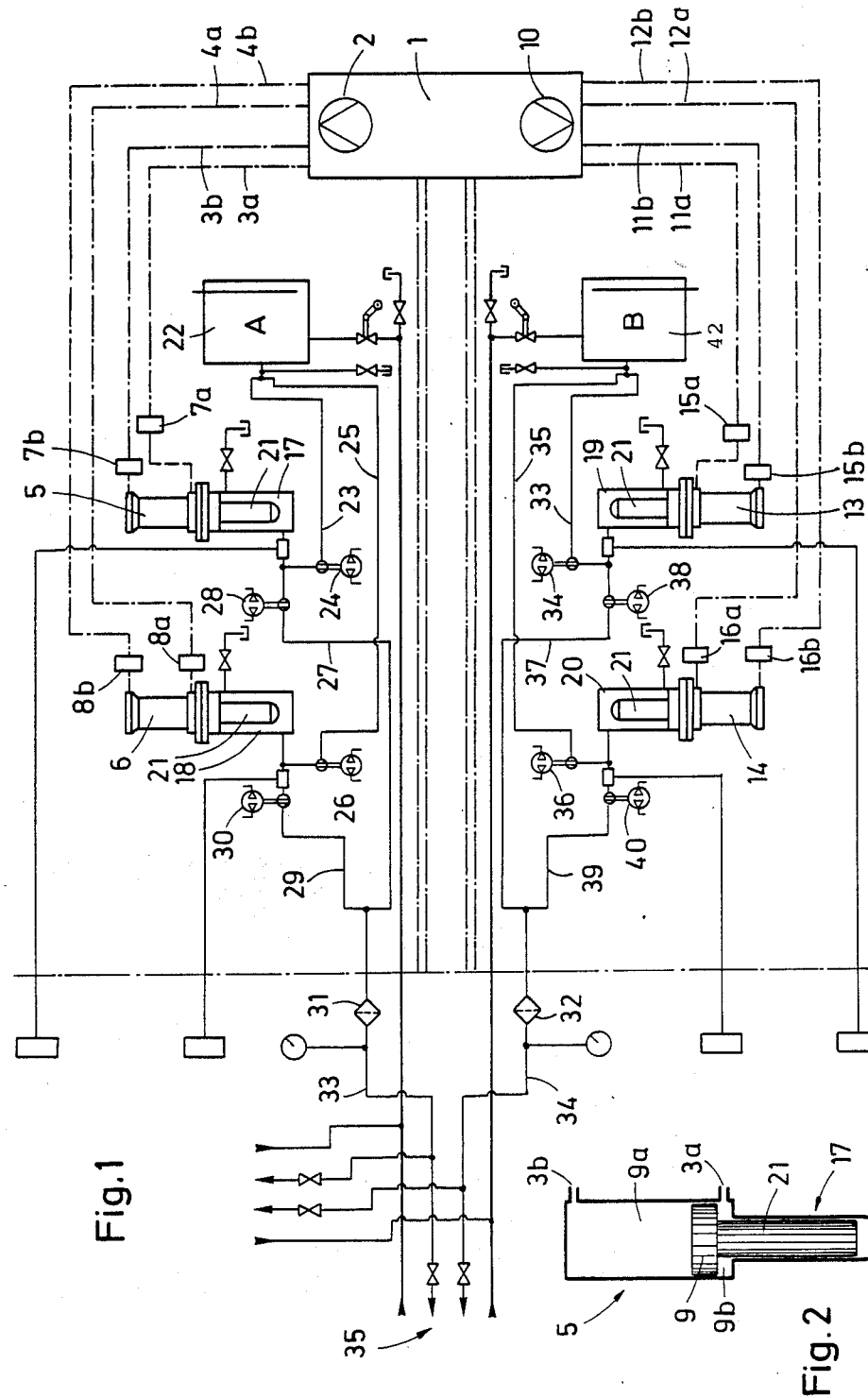

4,886,643

APPARATUS FOR PROPORTIONING REACTION MIXTURES

BACKGROUND OF THE INVENTION

1. Field of the Invention

The present invention relates to an apparatus for proportioning reaction mixtures, particularly for the manufacture of hard polyurethane foam The apparatus includes two proportioning cylinders for proportioning each of the components into a mixing head. The pistons of the two proportioning cylinders can be operated alternatingly for filling the cylinders with the component and subsequently ejecting the component from the cylinders.

2. Description of the Prior Art

An apparatus of the type described above for the proportioning of reaction mixtures is known from "Kunststoff-Handbuc" (Plastics Material Manual), Vol.VII, Polyurethane, Carl Hanser Verlag Munich, 1966, Page 138. This known apparatus includes two pairs of proportioning cylinders which are operated by a common mechanical crank mechanism in such a way that during each rotation of the crank one of the proportioning cylinders is filled by taking in the component, while simultaneously the other, already filled cylinder ejects the component.

Accordingly, the known apparatus operates intermittently, i.e., it ejects the two components in a batch-wise manner. The sequence of the proportioning and mixing operations of the apparatus are determined by a constant pressure acting on the supply reservoir for the two components.

However, practical experience has shown that the manner of operation of this known apparatus is unsatisfactory because it is not possible to achieve a constant ejection of the components over the stroke of the oppositely operating pistons of the two proportioning cylinders. This disadvantage of the known proportioning apparatus is due to the operation of the mechanical crank drive which moves the oppositely acting proportioning pistons of the two cooperating proportioning cylinders for each component.

It is, therefore, the primary object of the present invention to provide an apparatus of the above-described type for the proportioning of reaction mixtures, for example, in mixing heads for the production of hard polyurethane foam, which is suitable for a continuous production of a mixture in spite of the intermittent manner of operation.

SUMMARY OF THE INVENTION

In accordance with the present invention, the apparatus of the above-described type includes double-acting hydraulic cylinders driven by a common hydraulic pump, wherein the proportioning pistons of the two proportioning cylinders provided for conveying one of the components are operated independently from each other by a hydraulic cylinder each. A servo-controlled proportional valve is provided in each connecting lines between the hydraulic cylinders and the hydraulic pump. The control cycles of the proportional valves determining the ejection of the two cooperating proportioning cylinders are adjusted relative to each other so as to temporarily overlap.

The above-described measures make it possible in a simple manner that, prior to the conclusion of the ejection stroke of the proportioning piston in one of the proportioning cylinders, the ejection stroke of the proportioning piston in the other proportioning cylinder already begins and that, consequently, during a certain period of time of the ejection cycle, one and the same component is conveyed into the mixing head simultaneously from both cooperating proportioning cylinders.

In accordance with an important feature of the present invention, the rates of flow of the hydraulic liquid to the ejection side of the pistons of the hydraulic cylinders are inversely controlled by the two proportional valves during the time of overlap of the control cycles thereof, so that the two proportional valves together are controlled in such a way that a constant total rate of flow results.

As a result of the above-described features, the amount of component ejected from one of the proportioning cylinders decreases to the same extent as the amount of component ejected from the other proportioning cylinder increases. As a result, continuously a constant amount of the component is conveyed toward the mixing head.

In accordance with another feature of the present invention, the control cycles of the proportional valves determining the filling of the two proportioning cylinders are adjusted offset relative to each other with respect to time and the temporary overlap of the control cycles for the ejection of the component from the two proportioning cylinders takes place during this offset time.

In accordance with another important feature of the present invention, the temporary overlap of the control cycles for the ejection procedure of the component from the two proportioning cylinders is shorter than the offset time between the filling procedures for these proportioning cylinders.

It has been found particularly useful if the temporary overlap of the control cycles for the ejection of the component from the two proportioning cylinders corresponds to approximately a third of the offset time between the filling procedures for the two proportioning cylinders.

Finally, in accordance with yet another feature of the present invention, the temporary overlap of the control cycles for the ejection of the component from the two projection cylinders is superimposed on the end portion of the offset time between the filling procedures for the two proportioning cylinders.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

BRIEF DESCRIPTION OF THE DRAWING

In the drawing:

FIG. 1 is a flow diagram of an apparatus for proportioning reactant mixtures in accordance with the present invention;

FIG. 2 is a schematic sectional view, on a larger scale, of a proportioning cylinder with double-acting hydraulic cylinder driving the proportioning cylinder;

DETAILED DESCRIPTION OF THE INVENTION

Figure 3:
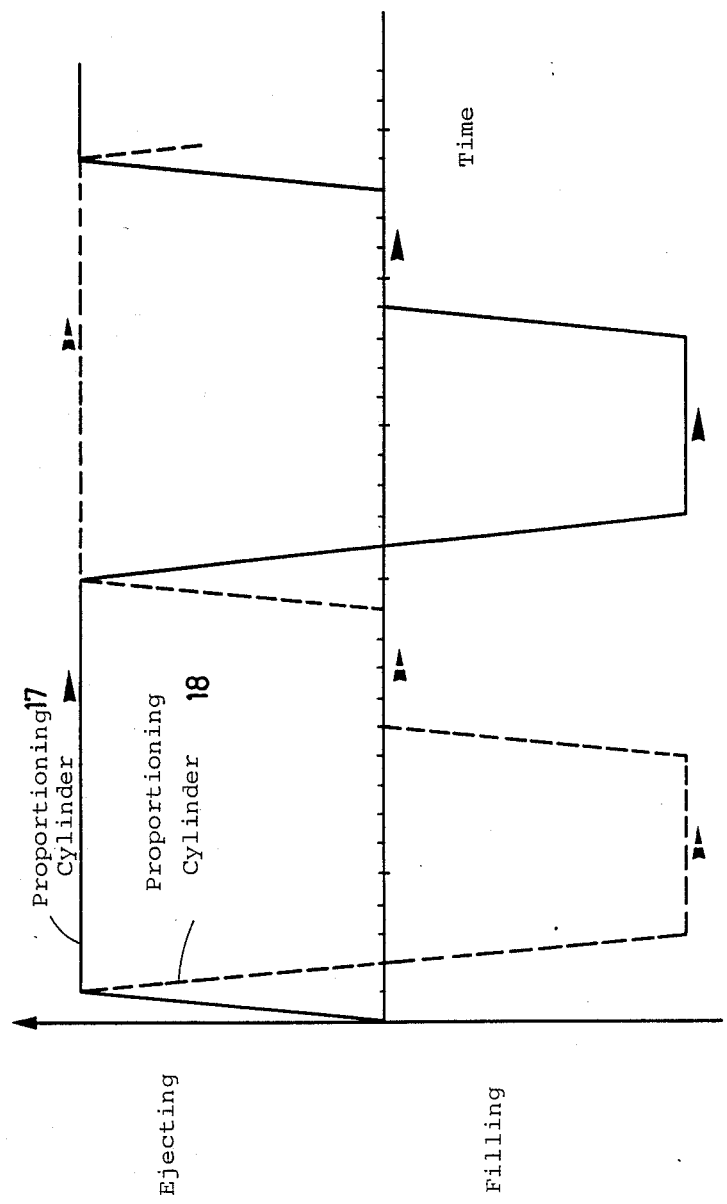
FIG. 3 is a volumetric flow diagram for a pair of proportioning cylinders cooperating for the continuous conveyance of a reaction component.

The flow diagram of an apparatus for the proportioning of reaction mixtures of FIG. 1 illustrates a liquid reservoir 1 from which a pump 2 delivers hydraulic liquid through four different lines 3a, 3b and 4a, 4b shown in dash-dotted lines. The two lines 3a and 3b lead to a double-acting hydraulic cylinder 5, while the two lines 4a and 4b are connected to a double-acting hydraulic cylinder 6.

Lines 3a and 3b leading to hydraulic cylinder 5 are provided with a proportional valve 7a or 7b, respectively while lines 4a and 4b leading to hydraulic cylinder 6 each have a proportional valve 8a or 8b, respectively.

Another pump 10 conveys hydraulic liquid from liquid reservoir 1 through four lines 11a, 11b and 12a, 12b. Of these lines, lines 11a and 11b lead to a double-acting hydraulic cylinder 13 and lines 12a and 12b are connected to a double-acting hydraulic cylinder 14. Lines 11a and 11b each again have a proportional valve 15a and 15b, respectively, while lines 12a and 12b have proportional valves 16a and 16b, respectively.

Hydraulic cylinder 5 cooperates with a proportioning cylinder 17. In the same manner, hydraulic cylinder 6 cooperates with a proportioning cylinder 18.

Hydraulic cylinder 13 actuates a proportioning cylinder 19 and, in the same manner, hydraulic cylinder 14 actuates proportioning cylinder 20.

As illustrated in FIG. 2 with the aid of double-acting hydraulic cylinder 5, all hydraulic cylinders 5, 6, 13 and 14 include a piston 9 on which hydraulic liquid acts alternatingly from both sides, for example, through lines 3a and 3b. Thus, the hydraulic cylinders can be moved in a positive manner in both possible directions of movement. A plunger piston 21 projecting into proportioning cylinders 17, 18, 19 or 20 is connected to piston 9. Depending on the direction of movement of piston 9 in the hydraulic cylinder, the plunger piston 21 is also moved in its proportioning cylinder, i.e., the volume by which each of the proportioning cylinders 17, 18, 19 and 20 is filled can be increased or decreased by the displacement movement of the plunger piston.

The two proportioning cylinders 17 and 18 cooperate with a reservoir 22 for the component A which may be, for example, polyol. Through a line 23 and a valve 24, proportioning cylinder 17 can be optionally connected or separated from reservoir 22 for component A. Also, through a line 25 and a valve 26, proportioning cylinder 18 can be connected or separated from reservoir 22 for component A.

On the other hand, it is also possible to have proportioning cylinder 17 act on a line 27 with a valve 28, while proportioning cylinder 18 cooperates with a line 29 and a valve 30. The two lines 27 and 29 lead to a splitting filter 31.

A reservoir 42 for component B, for example, isocyanate, may be connected through a line 33 and a valve 34 to proportioning cylinder 19, while reservoir 4 may be connected to proportioning cylinder 20 through a line 35 and a valve 36. Proportioning cylinder 19 may be connected to a line 37 with a valve 38, while proportioning cylinder 20 may be connected to a line 39 with a valve 40. The two lines 37 and 39 lead to a splitting filter 32.

The lines 33 and 34 leading away from the two splitting filters 31 and 32 both act as flow lines for the two components A and B toward the mixing head 35.

It should additionally be mentioned that the proportional valves 7a, 7b; 8a, 8b; 15a, 15b; 16a, 16b arranged in hydraulic lines 3a, 3b; 4a, 4b; 11a, 11b; 12a, 12b, respectively, are each constructed as servo-controlled valves which are capable of influencing in a very specific manner the rates of flow of the hydraulic liquid to the two cylinder spaces 9a and 9b of the respective hydraulic cylinder 5 and 6 or 13 and 14.

Of particular importance in this respect is a mutually adjusted operation of the proportional valves 7b and 8b, on the one hand, which control the ejection of the component from the proportioning cylinders 17 and 18, and a mutually adjusted manner of operation of the proportional valves 15b and 16b, on the other hand, which influence the ejection of the component from the two proportioning cylinders 19 and 20.

The filling procedure for the components in the proportioning cylinder 17 and 18 is determined by the proportional valves 7a and 8a, while, in a similar manner, the filling procedure for the proportioning cylinders 19 and 20 is determined by proportional valves 15a and 16a.

When proportional valve 7a of hydraulic cylinder 5 is opened for filling the proportioning cylinder 17, valve 24 is simultaneously also opened, so that a connection of proportioning cylinder 17 with reservoir 22 for component A is effected through line 23. At the same time, however, valve 28 in line 27 leading away from proportioning cylinder 17 is closed.

When proportional valve 8a for hydraulic cylinder 6 is opened for filling the proportioning cylinder 18, valve 26 in line 25 is also simultaneously opened, so that a connection of the proportioning cylinder 18 with reservoir 22 for component A is effected through line 25. Simultaneously, valve 30 in line 29 leading away from proportioning cylinder 18 is closed.

Proportional valve 15a of hydraulic cylinder 13 is opened for filling the proportioning cylinder 19. Simultaneously, valve 34 in line 3 which connects proportioning cylinder 19 with reservoir 42 for component B is opened.

In order to fill proportioning cylinder 20, proportional valve 16a for hydraulic cylinder 14 is opened. Simultaneously, by opening valve 36, line 35 effects a connection between the proportioning cylinder 20 and reservoir 42 for component B. During this filling procedure, valves 38 or 40 in the lines 37 or 39, respectively, leading away from proportioning cylinders 19 or 20 are closed.

In describing the control sequence of the proportioning apparatus illustrated in FIG. 1, it shall be assumed that proportioning cylinder 17 is filled with component A and proportioning cylinder 19 is filled with component B, while proportioning cylinder 18 is not yet filled with component A and proportioning cylinder 20 is not yet filled with component B. At the beginning of the operating cycle, the proportional valves 7b and 15b in lines 3b and 11b, respectively, leading to hydraulic cylinders 5 and 13 are opened, so that pistons 9 can each influence plunger pistons 21 of proportioning cylinders 17 and 19 in order to eject components A and B, respectively. With valves 28 and 38 being opened, components A and B are conveyed through lines 27 and 37 into the splitting filters 31 and 32 and then through the flow lines 33 and 34 into the mixing head 35. In the meantime, the proportional valves 8a and 16a arranged in lines 4a and 12a, respectively, leading to proportioning cylinders 6 and 14 are opened in such a way that the pistons 9 thereof act on the plunger pistons 21 of proportioning cylinders 18 and 20 in order to fill these cylinders, i.e., the pistons are moved upwardly in order to fill the cylinder spaces. The cylinder spaces are connected to the reservoirs 22 and 42 for components A and B, respectively, through valves 26 and 36 and lines 25 and 35, respectively.

In the above-described procedure, the proportional valves 8a and 16a are controlled in such a way that the filling procedure for proportioning cylinders 18 and 20 is concluded more quickly than the process of ejecting components A and B from proportioning cylinders 17 and 19.

Shortly before the procedure of ejecting components A and B from proportioning cylinders 17 and 19 is concluded, the control of the proportional valves acting on hydraulic cylinders 6 and 14 for proportioning cylinders 18 and 20 is changed in such a way that hydraulic liquid is now conducted through proportional valves 8b and 16b, so that pistons 9 act on the plunger pistons 21 of proportioning cylinders 18 and 20 so as to eject component therefrom.

Consequently, shortly before the conclusion of the ejection of component A from proportioning cylinder 17, the ejection of component A from proportioning cylinder 18 already begins. In the same manner, shortly before the conclusion of the ejection of component B from proportioning cylinder 19, the ejection of the component B from proportioning cylinder 20 already begins.

As soon as the procedure of ejection of components A and B from proportioning cylinders 17 and 19, respectively, have been concluded, the proportional valves 7b and 7a, 15b and 15a are changed in such a way that pistons 9 of hydraulic cylinders 5 and 13 are retracted and, thus, by means of plunger pistons 21, proportioning cylinders 17 and 19 are again filled with components A and B, respectively, while at the same time the ejection procedure of components A and B from proportioning cylinders 18 and 20, respectively, still continues.

Accordingly, the manner of operation of the proportioning apparatus according to the present invention is such that the control cycles of the proportional valves 7b and 8b, 15b and 16b determining the ejection procedure from the two cooperating proportioning cylinders 17 and 18, 19 and 20 are temporarily overlapped. These proportional valves 7b and 8b, 15b and 16b operate preferably in such a way that the rate of flow of the hydraulic liquid through the lines 3a and 4a, 11a and 12a to pistons 9 of proportioning cylinders 5 and 6, 13 and 14 are inversely controlled during the time of overlap of their control cycles, i.e., the two proportional valves 7b and 8b, 15b and 16b are both controlled so as to obtain a uniform total rate of flow of the hydraulic liquid.

As can be concluded from the above-described sequences, during the period of overlap of the control cycles, the entire ejection of component A from proportioning cylinders 17 and 18 or component B from proportioning cylinders 19 and 20 is the same as the amount normally ejected from only one of these proportioning cylinders 17 and 18 or 19 and 20.

It should further be pointed out that the control cycles for the proportional valves 7a and 8a, 15a and 16a which determine the filling of the two operating proportioning cylinders 17 and 18, 19 and 20, are adjusted so as to be offset relative to each other with respect to time and that the temporary overlap of the two control cycles is caused to take place in this offset time in order to achieve a joint ejection of components on both proportioning cylinders 17, 18 or 19,20, respectively. However, the temporary overlap of the control cycles for the ejection procedure from both proportioning cylinders 17 and 18, 19 and 20 is always adjusted to be shorter than the offset time between the filling procedures for these proportioning cylinders 17 and 18 or 19 and 20.

The diagram of FIG. 3 shows an example of the possible sequence of the cooperation of the two proportioning cylinders 17 and 18. The curve portions located above the horizontal time coordinate each indicate the volume flows ejected from the two proportioning cylinders 17 and 18 and indicate how and where these volumetric flows overlap with respect to time.

The curve portions located below the horizontal time coordinate each indicate the sequence and the pattern of the filling procedures for the two proportioning cylinders 17 and 18. It can further be seen that the temporary overlap of the control cycles for the ejection procedure from both proportioning cylinders 17 and 18 corresponds to approximately a third of the offset time between the filling procedures for both proportioning cylinders 17 and 18. In addition, it can be seen that the temporary overlap of the control cycles for the ejection procedure of both proportioning cylinders 17 and 18 are superimposed in the final portion of the offset time between the filling procedures of both proportioning cylinders 17 and 18. Between the time each filling procedure ends and the ejection procedure from the respective proportioning cylinders 17 or 18 begins is a non-active period which is indicated by a curve portion located on the horizontal time coordinate.

The temporary overlap of the ejection procedures of both proportioning cylinders 17 and 18 is clearly recognizable in the diagram of FIG. 3 by the acute triangles formed by the curve portions located above the horizontal time coordinate. Thus, the volumetric flow of the component A ejected from the second proportioning cylinder, for example, proportioning cylinder 18, increases to the same extent as the volumetric flow of the same component A being ejected from the first proportioning cylinder, for example, proportioning cylinder 17, decreases.

Of course, the volumetric flow diagram shown in FIG. 3 with respect to the proportioning cylinders 17 and 18 for component A is applicable in the same manner to the proportioning cylinders 19 and 20 for component B.

The control of the servo-controlled proportional valves 7a, 7b; 8a, 8b; 15a, 15b; 16a, 16b for the hydraulic cylinders 5; 6; 13; 14 may be carried out by a computer-assisted program However, the control may also be effected in dependence upon distance travelled, for example, in accordance with the distance travelled by the respective plunger piston 21 in the proportioning cylinders 17, 18 or 19, 20. It is important, however, that the filling procedure for each of the cooperating proportioning cylinders 17 and 18 or 19 and 20 takes place during a period of time which is shorter than the period of time required for the ejection procedure of the component from the respective proportioning cylinder 17 and 18 or 19 and 20. It is only in this manner that it can be ensured that the ejection procedures from both cooperating proportioning cylinders 17 and 18 or 19 and 20 overlap as necessary and for the time period required.

While a specific embodiment of the invention has been shown and described in detail to illustrate the application of the inventive principles, it will be understood that the invention may be embodied otherwise without departing from such principles.

I claim:

1. An apparatus for proportioning reaction mixtures, comprising two first proportioning cylinders for proportioning a first of the components and two second proportioning cylinders for proportioning a second of the components into a mixing head, the proportioning cylinders each including proportioning pistons capable of being operated alternatingly for filling the proportioning cylinders with the component and subsequently ejecting the component from the proportioning cylinders, two first double-acting hydraulic cylinders for operating the proportioning pistons for the first two proportioning cylinders independently of each other and two second double-acting hydraulic cylinders for operating the proportioning pistons of the second two proportioning cylinders independently of each other, a first common hydraulic pump for driving the first two double-acting hydraulic cylinders and a second common hydraulic pump for driving the second two double-acting hydraulic cylinders, each of the first two hydraulic cylinders being connected to the first hydraulic pump by means of two connecting lines and each of the second two hydraulic cylinders being connected to the second hydraulic pump by means of two connecting lines, servo-controlled proportional valves provided in each of the connecting lines for controlling the quantity of hydraulic liquid conducted to the hydraulic cylinders, means for adjusting the control cycles of the proportional valves determining the ejection of the first component from the first two proportioning cylinders relative to each other so as to temporarily overlap and means for adjusting the control cycles of the proportional valves determining the ejection of the second component from the second two proportioning cylinders relative to each other so as to temporarily overlap, means for inversely controlling the rates of flow of the hydraulic liquid to the hydraulic cylinders for effecting ejection of the component by the two proportional valves during the overlap of the control cycles thereof, and means for controlling the two proportional valves together in such a way that a constant total rate of flow is obtained.

2. The apparatus according to claim 1, comprising means for adjusting offset relative to each other with respect to time the control cycles of the proportional valves determining the filling of the two proportioning cylinders, and means for setting the temporary overlap of the control cycles for the ejection of the component from the two proportioning cylinders to take place during the offset time.

3. The apparatus according to claim 1, comprising means for setting the temporary overlap of the control cycles for the ejection of the component from the two proportioning cylinders to be shorter than the offset time between the filling procedures for the proportioning cylinders.

4. The apparatus according to claim 1, comprising means for setting the temporary overlap of the control cycles for the ejection of component from the proportioning cylinders to be approximately one-third of the offset time between the filling procedures for the two proportioning cylinders.

5. The apparatus according to claim 4, comprising means for setting the temporary overlap of the control cycles for the ejection of the component from the two projection cylinders to be superimposed on the end portion of the offset time between the filling procedures for the two proportioning cylinders.

* * * * *